Jan. 19, 1954   H. F. DIUBLE   2,666,653
COUPLING DEVICE WITH GUIDE MEANS
Filed Aug. 22, 1950
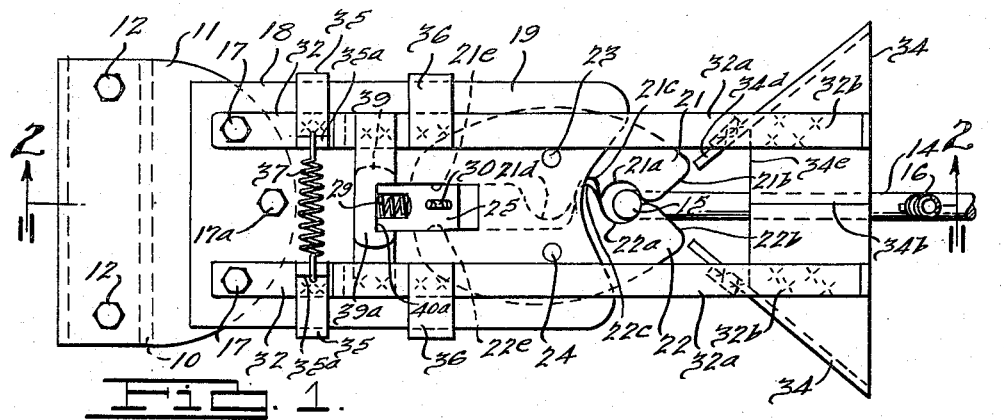
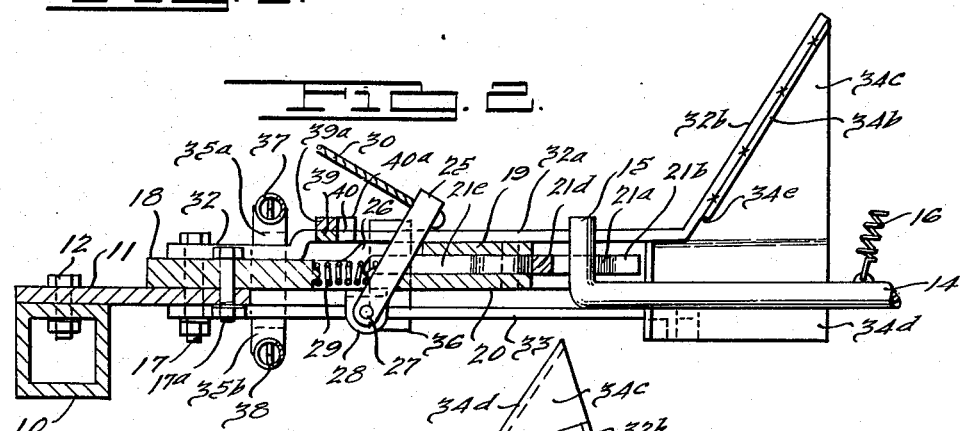
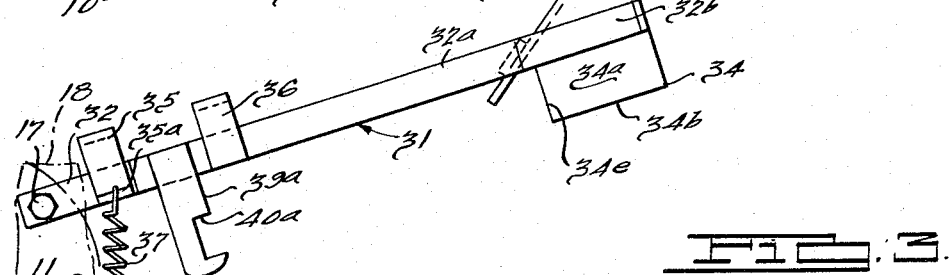
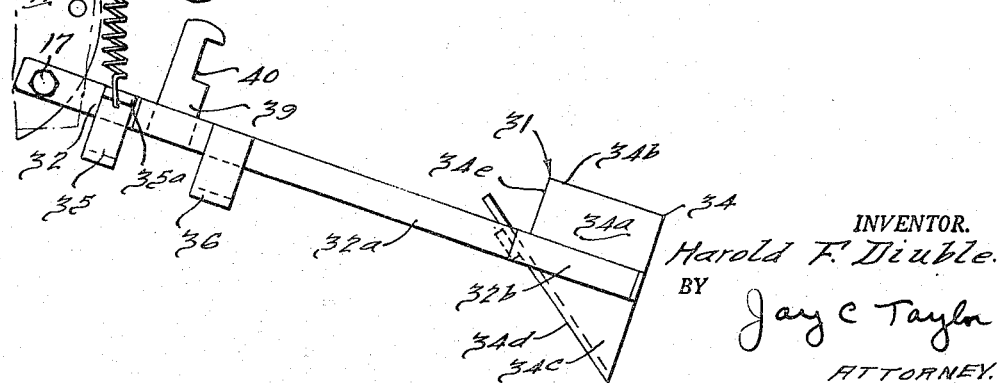
INVENTOR.
Harold F. Diuble.
BY
Jay C Taylor
ATTORNEY.

Patented Jan. 19, 1954

2,666,653

UNITED STATES PATENT OFFICE 2,666,653

COUPLING DEVICE WITH GUIDE MEANS

Harold F. Diuble, Ann Arbor, Mich.

Application August 22, 1950, Serial No. 180,858

7 Claims. (Cl. 280—478)

This invention relates to a coupling device and in particular to improved means for guiding the coupling elements of a driven vehicle and a trailer into engagement with each other.

In a customary coupling between two vehicles, as for example between a trailer and a tractor, a pair of interengageable coupling elements are provided, one mounted at the rear of the tractor and one mounted at the front of the trailer. Upon backing the tractor toward the front end of the trailer, the two coupling elements may be brought into engagement and interlocked with each other. Because of the difficulty of backing the tractor accurately to the desired position with respect to the trailer to permit engagement between the two coupling elements, it is usually necessary for the driver to tug and pull the trailer manually into the final position, or to employ a helper to guide the driver in his operation of the tractor.

An important object of the present invention is to provide coupling means of the foregoing nature including a simple, practicable guide carried by one of the vehicles and having guide portions extending outward therefrom toward the other vehicles so as to engage the coupling element of said other vehicle in guiding relation and thereby guide the two coupling elements into engagement with each other upon backing of the tractor toward the trailer. Preferably the guide means is provided at its outer end with guide portions extending outward beyond the coupling element carried by the vehicle on which the guide means is mounted, as for example a hopper having a large outer opening and lateral surfaces converging toward the last named coupling element.

In such a construction, turning of the tractor is hampered by engagement between said outer guide portions and at least one of the coupling elements when the tractor is turned sharply with respect to the trailer. This feature becomes critical where sharp or right angle turns are frequently necessary, as for example in towing farm equipment or machinery.

It is accordingly another object of the present invention to provide a guide means of the foregoing character which is firmly held in a guiding position by a detent member before the two vehicles are coupled, but which is released to move with the coupled elements as required upon swinging thereof with respect to each other, as for example when one of the vehicles is turned sharply relative to the other.

Another object is to provide such a guide means which is readily mountable on a tractor or trailer and adaptable for use with existing coupling equipment, the guide means being releasably engageable with the usual detent member provided to hold the existing coupling elements in interlocking engagement with each other, the guide means being held in said guiding position by said detent member prior to coupling said elements together and being released from said detent member to swing with the coupling elements when the latter are coupled together.

Other objects of this invention will appear in the following description and appended claims, reference being had to the accompanying drawings forming a part of this specification wherein like reference characters designate corresponding parts in the several views.

Fig. 1 is a fragmentary plan view showing an example of a coupling device embodying the present invention.

Fig. 2 is a vertical longitudinal section taken in the direction of the arrows substantially along the line 2—2 of Fig. 1.

Fig. 3 is a plan view showing the guide means in an open position, other portions of the coupling device being removed.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings, a particular embodiment of the present invention is illustrated by way of example in a device for coupling a trailer and a tractor. Although the trailer and tractor may be readily interchanged, the tractor in the present instance is provided with a rear cross-sill 10 having a horizontal towplate 11 suitably secured thereto by bolts 12. Extending forward from the trailer, not shown, and preferably mounted thereon for swinging freely horizontally is a forwardly extending tow bar 14 terminating in an upright pin 15 and supported at a desired elevation by a spring 16 connecting the bar 14 and an upper portion of the trailer body.

Suitably bolted on the rearward extension of the tow plate 11, as by paired lateral bolts 17 and an intermediate bolt 17a, is a horizontal casting or yoke 18 which terminates rearwardly in vertically spaced upper and lower supporting plates 19 and 20, Figs. 1 and 2. Interposed between the plates 19 and 20 are a pair of horizontally swinging coupling members 21 and 22 arranged side by side and pivotally mounted on pins 23 and 24 respectively which are supported above and below within the plates 19 and 20 and extend vertically through the rearward portions thereof in laterally spaced relation. Rearward of the pivots 23, 24, the corresponding latching members are provided with confronting dogging portions 21a and 22a cooperable to receive and hold the pin 15 therebetween when they are in the closed position, Fig. 1. The rearward edges of the corresponding coupling members diverge at 21b and 22b to afford cam edges for guiding the pin 15 forward into position between the dogging portions 21a, 22a.

The forward edges of the dogging portions 21a, 22a terminate in lapping inward extensions, of which the extension 22c of the coupling member 22 extends into a notch 21c in advance of the forward edge of the dogging portion 21a. In order to achieve horizontal swinging of the members 21 and 22 in unison, these members are dimensioned so that the rearward edges of the notch 21c and interfitting extension 22c ride along each other. Thus upon clockwise pivoting or closure movement of the member 21 about its pivot 23, as for example by reason of forward movement of the pin 15 against the forward edge of the dogging portion 21a, the rearward edge of the notch 21c will be forced against the rearward edge of the extension 22c, causing counterclockwise pivoting or closure movement of the member 22. Similarly the forward edges of the extension 22c and notch 21c ride along each other, the latter continuing inward and forward in a rounded extension 21d forward of the extension 22c. Thus upon counterclockwise pivoting or closure movement of the member 22, as for example by reason of forward movement of the pin 15 against the forward edge of the dogging portion 22a, the forward edge of the extension 22c will be forced against the forward edge of the notch 21c, causing clockwise pivoting or closure movement of the member 21.

It is apparent from Fig. 1 that upon rearward movement of the pin 15 against the rearward edges of the dogging portions 21a, 22a, the latter will pivot away from each other to open positions unless otherwise locked against such pivotal movement by a detent member 25 interposed between the confronting inner edges 21e and 22e which extend forward from the corresponding extensions 21d and 22c in parallel spaced relation on opposite sides of the longitudinal mid-plane between the pivots 23, 24. When locked against such movement as discussed below, the pin 15 will be confined between the dogging portions to complete the coupling for either towing or pushing purposes.

The detent member employed in the present instance to hold the coupling members 21, 22 in the closed or latching position comprises a vertically swinging lever which extends downward through a central opening 26 in the plates 19 and 20 and is mounted at its lower end on a horizontal transverse pivot 27 for swinging upward and forward or downward and rearward. The pivot 27 is located forward of the coupling members 21, 22 and is supported at opposite ends by laterally spaced bosses 28 depending from the casting 18. The opening 26 in the casting plates 19 and 20 for the detent 25 extends longitudinally forward sufficiently to permit the latter to swing forward from its detent position between the edges 21e, 22e and thereby release those edges for swinging toward each other, whereupon the rearward dogging portions 21a, 22a will separate or swing to open positions for release of the pin 15 therefrom. Normally the detent 25 is yieldingly held rearward in the detent position between the edges 21e, 22e by a coil spring 29 maintained under compression between the forward edge of the opening 26 and detent 25. The latter is readily withdrawn forward from the detent position, as for example by a pull cord 30 under the control of the tractor operator. The structure described thus far may be conventional is desired and is accordingly not discussed in further detail.

In order to facilitate the engagement between the pin 15 and dogging portions 21a, 22a, a pair of swinging guide members 31 are provided, Fig. 3, one one each side of the coupling device and each being substantially a mirror image of the other. Each member 31 comprises a pair of vertically spaced upper and lower swinging arms 32 and 33, Fig. 2, which extend horizontally rearward from pivotal connections at their forward ends with the corresponding laterally spaced bolt 17 employed to secure the casting 18 to the towplate 11. The lower arms 33 extend horizontally rearward from below the towplate 11 on opposite sides of the coupling device. The forward portion of each upper arm 32 extends rearward from above the casting 18 generally in parallelism with its corresponding lower arm 33. The rearward portion of each arm 32 is offset upward at 32a in order to clear the upper surface of the plate 19 and terminates in a rearwardly inclined bracket 32b.

The rearward portion of each guide member 31 comprises a hopper member 34 formed from steel plates and cooperating with the hopper member 34 of the other member 31 to complete a rearwardly opening funnel-like guide for directing the pin 15 toward the converging edges 21b, 22b. Welded to each bracket 32b is a rearwardly inclined plate 34a of the hopper or funnel-like guide 34 which terminates inward at an edge 34b parallel to the bracket 32b and abutting the corresponding edge 34b of the adjacent hopper element along the longitudinal vertical mid-plane of the coupling device when the hopper members 34 are in the guiding position, Fig. 1. Laterally of the bracket 32b, each hopper member 34 slopes obliquely forward and laterally as a plate portion 34c which terminates in a vertical wall 34d. The latter converges forward toward the corresponding wall 34d of the other hopper member 34 and terminates immediately rearward of the corresponding edge 21b or 22b when the paired hopper members 34 are adjacent each other in the guiding position, Fig. 1. The lower edge 34e of the plate 34a terminates at a suitable height to provide clearance for the upper end of the pin 15, Fig. 2.

The swinging arms 32, 33 of each pair are maintained in vertically spaced relation by a pair of U-shaped brackets 35 and 36, each having a vertical portion located laterally of the casting 18 and spacing the arms 32, 33 and also having inward extensions welded above and below to the corresponding arm 32 or 33. In addition, the rearward end of each arm 33 is welded to the corresponding hopper wall 34d. The swinging guide members 31 are yieldingly held in a guiding position, with the confronting edges 34b abutting, by means of upper and lower transverse springs 37 and 38, the former being connected at opposite ends under tension to paired supports 35a, each integral with and extending upward from a corresponding bracket 35, and the latter being likewise connected at opposite ends under tension to paired supports 35b, each depending from and integral with a corresponding bracket 35.

In order to lock the guide members 31 positively in the guiding position, each arm portion 32a is provided with an inward extending detent or jaw member, one overlapping the other and each provided with a rearward opening notch or jaw adapted to receive the detent 25 therein when the latter is pulled forward from the detent position between the edges 21e, 22e. Thus the left arm 32a is provided with an inward extension 39 notched at 40 for the purpose aforesaid and the right arm 32a is similarly provided with an inward extension 39a overlying the extension 39 and notched at 40a. Accordingly when the detent 25 is pulled forward into the detent engaging notches 40, 40a, the guide members 31 are prevented from swinging and are securely held in the guiding position.

It is apparent from the foregoing that the tractor operator may readily complete the coupling with the trailer merely by pulling the detent 25 forward from the detent position between the edges 21e, 22e and holding the same between the notches 40, 40a, as for example by pulling on the cord 30 and securing it to a fixed member of the tractor. Thereafter the tractor is backed toward the forwardly extending towbar 14 so as to position the pin 15 within the opening of the mouth of the hopper member 34. Continued movement of the tractor toward the trailer will of course guide the pin 15 between the converging edges 21b, 22b and thereafter into latching position between the dogging portions 21a, 22a. When the pin 15 strikes the forward edge of either dogging portion 21a or 22a, these will close around the pin 15 as indicated in Fig. 1 and discussed above. Thereafter the cord 30 is released and the detent 25 is moved rearward by the spring 29 into detent position between the edges 21e, 22e, causing the pin 15 to be positively locked between the dogging members 21a, 22a. As thus engaged, movement of the trailer will be controlled by movement of the tractor and the latter may be turned as sharply as desired without interference from the guide members 31, since the latter are free to swing laterally as required if engaged by the towbar 14 upon lateral swinging thereof in either direction.

I claim:

1. In a device for coupling two vehicles, coupling means adapted to be carried by one vehicle comprising a pair of pivotal members having dogging portions separable to receive a coupling element therebetween carried by the other vehicle and being movable together to lock the coupling element therebetween, said pivotal members also having detent engaging portions separable to receive a detent member therebetween upon movement of the dogging portions together, a pair of swinging guide members mountable on said one vehicle on opposite sides of the coupling means to swing horizontally with the coupled coupling means and element upon turning of the vehicles, said guide members at a guiding position having portions extending beyond the dogging portions and converging generally thereto to guide said coupling means and element into engagement with each other, detent means movable between said detent engaging portions to hold the dogging portions together and also movable to a position from between said detent engaging portions, and means carried by said guide members to interlock with said detent means in the last named position to hold said guide portions in said guiding position.

2. In a coupling device carried by a vehicle and movable into interlocking engagement with a coupling device carried by another vehicle upon relative movement of said vehicles generally toward each other, the combination of a pair of swinging guide means carried by one vehicle and mounted to swing apart from each other upon relative turning of said vehicles when the latter are coupled, spring means yielding urging the two guide means toward each other into guiding position, said guide means being cooperable with each other at the guiding position to guide said coupling devices into said interlocking engagement upon said relative movement of said vehicles generally toward each other, and detent means carried by said one vehicle and shiftable to a detent position to hold said devices in interlocking engagement and being shiftable from the detent position to a holding position to hold said guide means at the guiding position.

3. In a coupling device carried by a member and movable into articulated interlocking engagement with a second coupling device upon relative movement of said devices toward each other, detent means carried by said member and shiftable to a detent position to hold the interlocked devices in interlocking engagement, a pair of shiftable guide means carried by said member and movable by engagement with the interlocked devices when the latter are swung relative to each other, said pair of guide means being cooperable with each other at a guiding position to guide said coupling devices into said interlocking engagement upon said relative movement of said devices toward each other, said detent means being shiftable from said detent position to a holding position to hold said guide means at the guiding position.

4. In a coupling means carried by a member and movable into articulated interlocking engagement with a second coupling means upon relative movement of said coupling means toward each other, detent means carried by said member and shiftable between detent and holding positions, means for releasably holding the interlocked coupling means in interlocking engagement comprising detent engaging portions on said coupling means and engageable with said detent means at said detent position, a pair of independently shiftable guide means carried by said member and movable by engagement with the interlocked coupling means when the latter are swung relative to each other, spring means yieldingly urging said guide means toward each other to a guiding position, said guide means being cooperable with each other at said guiding position to guide said coupling means into said interlocking engagement upon their said relative movement toward each other, and means for releasably holding the guide means at said guiding position comprising detent engaging portions on said guide means and engageable with said detent means at said holding position.

5. In combination, supporting means, coupling means on said supporting means and adapted to be moved relative to a second coupling means into interlocking engagement therewith, detent means on said supporting means and shiftable to a detent position to hold the interlocked coupling means in interlocking engagement, a pair of swinging guides pivoted on said supporting means to swing with said interlocked coupling means by engagement therewith, said guides extending at a guiding position with respect to said supporting means to guide said coupling means into said interlocking engagement upon relative movement of said coupling means toward each other, spring means yieldingly urging said guides to the guiding position, said detent means being shiftable from said detent position to a holding position to hold said guides at the guiding position.

6. In a device for coupling two vehicles, coupling means adapted to be carried by one vehicle comprising shiftable means movable into articulated locking engagement with a second coupling means carried by the other vehicle, said shiftable means having detent engaging portions movable therewith to a detent engaging position upon movement of said shiftable means into said interlocking engagement with said second coupling means, a pair of swinging guide members mountable on said one vehicle to swing with the coupled coupling means upon turning of the vehicles, said guide members at a guiding position having portions extending beyond the shiftable means and converging generally thereto to guide said coupling means into engagement with each other, detent means movable into engagement with said detent engaging portions to hold the coupled coupling means in said interlocking engagement and also movable to a position out of engagement with said detent engaging portions, and means carried by said guide members and engageable with said detent means in the last named position to hold said guide portions in said guiding position.

7. In a device for coupling two vehicles, a pair of coupling means mountable on said two vehicles respectively and movable therewith into articulated interlocking engagement with each other, a pair of swinging guide members mountable on one of said vehicles to swing with the coupled coupling means upon turning of the vehicles, said guide members at a guiding position extending from said one vehicle beyond the latter vehicle's coupling means and converging thereto from opposite sides to guide said coupling means into said interlocking engagement with each other, detent means on said one vehicle and shiftable between detent and holding positions, means carried by said coupling means and engageable with said detent means at the detent position to hold said coupling means in said interlocking engagement, and means carried by said guide members and engageable with said detent means at the holding position to hold said guide members at said guiding position.

HAROLD F. DIUBLE.

References Cited in the file of this patent

UNITED STATES PATENTS

| Number | Name | Date |
| --- | --- | --- |
| 844,522 | Johnson | Feb. 19, 1907 |
| 2,048,310 | Wohldorf | July 21, 1936 |
| 2,124,467 | Lyman | July 19, 1938 |
| 2,245,270 | Goode | June 10, 1941 |
| 2,491,373 | Goff | Dec. 13, 1949 |

FOREIGN PATENTS

| Number | Country | Date |
| --- | --- | --- |
| 537,062 | Germany | Oct. 30, 1931 |
| 558,921 | Germany | Sept. 13, 1932 |